United States Patent [19]

Snyder

[11] 4,173,233
[45] Nov. 6, 1979

[54] PILOT VALVE

[75] Inventor: David E. Snyder, Longview, Tex.

[73] Assignee: U.S. Industries, Inc., New York, N.Y.

[21] Appl. No.: 853,515

[22] Filed: Nov. 21, 1977

[51] Int. Cl.² ............................................. G05D 7/00
[52] U.S. Cl. .................................. 137/102; 137/107; 137/464; 137/495
[58] Field of Search ................ 137/102, 464, 495, 107

[56] References Cited

U.S. PATENT DOCUMENTS

| | | | |
|---|---|---|---|
| 2,247,037 | 6/1941 | Smith | 137/495 X |
| 2,474,772 | 6/1949 | Ashton | 137/102 X |
| 3,272,218 | 9/1966 | Johnson | 137/102 |
| 3,294,111 | 12/1966 | Abercrombie | 137/102 X |
| 4,040,437 | 8/1977 | Gottling | 137/102 |

*Primary Examiner*—Harold W. Weakley

[57] ABSTRACT

There is disclosed a pilot valve which controls the flow of a control fluid to and from a fluid-operated actuator, and which comprises an inlet to admit the control fluid to a chamber thereof, a port connecting the chamber with the actuator, a passageway connecting the chamber with a vent port, and a ball which is shifted between a set position closing the passageway so that control fluid is admitted from the inlet to the actuator and a tripped position closing the inlet so that control fluid is exhausted from the actuator out the vent port.

18 Claims, 7 Drawing Figures

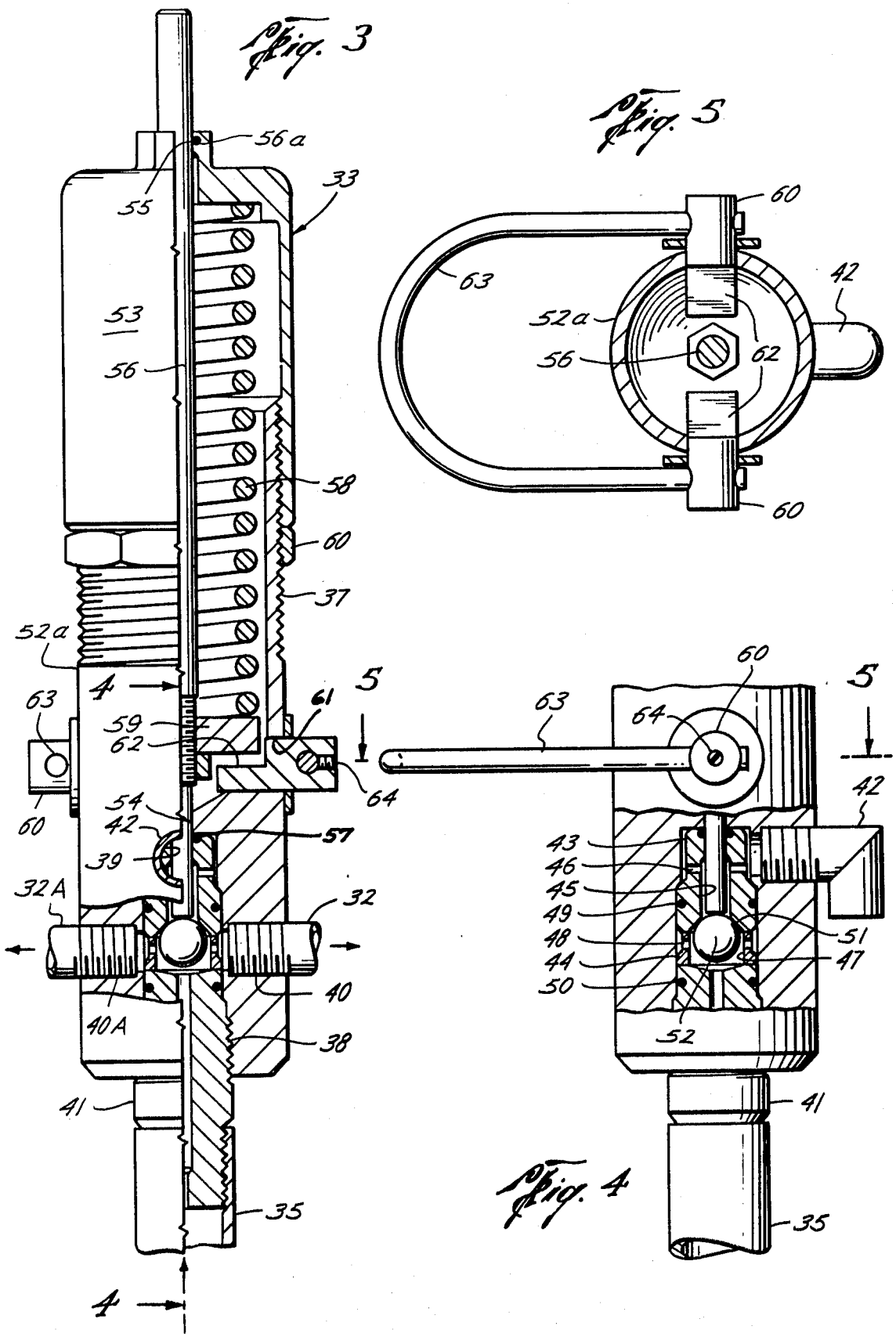

PILOT VALVE

This invention relates generally to a pilot valve; and, more particularly, to an improved pilot valve which may be used in sensing the pressure of fluid in a line in order to control the admission and exhaustion of operating fluid to and from a fluid-operated actuator for moving a valve in the line between flow-controlling positions automatically in response to a predetermined low pressure of the line fluid. In one of its aspects, it relates to an improved pilot valve of this type which is especially well suited for use in a system of this type wherein the operating fluid is line fluid and the pilot valve is used in conjunction with another sensor for controlling the admission and exhaustion of the line fluid automatically in response to a predetermined high pressure of the line fluid.

In systems of this type, the admission and exhaust of fluid to and from the actuator is controlled by one or more sensors each connecting to the line and actuator. When a pair of sensors are used, one is operable to control the actuator in response to a predetermined low line pressure, and the other is operable to control the actuator in response to a predetermined high line pressure. Preferably, the fluid for operating the actuator is the line fluid to be controlled inasmuch as this eliminates the need for a separate source of operating fluid. Although I am aware of a prior system which is line pressure operated, it is of complex construction in that it requires, among other things, a velocity check valve for permitting the admission of line fluid to the sensors upon exhaustion of line pressure from the actuator. Furthermore, although the line pressure sensor will remain open once tripped and can only be reset manually, so as to permit the user of the equipment to determine the source of malfunction before it is reset, this requires special parts and/or attention giving rise to human error.

U.S. Pat. No. 3,273,589 shows a low pressure pilot valve which is adapted to control the supply and exhaustion of line fluid to and from the actuator, and which further includes a shiftable valve means which is arranged and constructed to close and thus prevent the loss of line pressure in response to a predetermined low in the pressure in the line. Although the use of such a valve in this type of system would avoid the necessity of a velocity check valve, and thus provide a simpler construction insofar as the low pressure pilot valve is concerned, this patent does not disclose or suggest the use of such a pilot valve in a system having an additional sensor for also controlling the flow of line fluid in response to a predetermined high pressure therein. Furthermore, the shiftable valving means of the pilot valve of this patent is relatively complex, and the means by which the valving means may be reset, after exhausting the actuator, requires further manipulation, following resetting, to return it to its original position, thereby increasing the risk of its being left in a resetting position, and thus preventing the valving means from shifting to a tripped position for exhausting the actuator. Still further, this prior pilot valve provides no convenient means of adjusting the low pressure at which the valving means will shift to a position for exhausting the actuator, and further lacks any convenient means for manually overriding movement of the valving means to a position for so exhausting the actuator.

An object of this invention is to provide a low pressure pilot valve which does not require a velocity check valve in order to control fluid in the above-described or similar systems.

Another object is to provide such a low pressure valve whose reciprocating valve means is of extremely simple and inexpensive construction.

A further object is to provide such a low pressure pilot valve for those or similar systems in which the mechanism for manually resetting the valve means need not be further manipulated and does not require special tools for returning it to its original position after resetting.

A still further object is to provide such a low pressure pilot valve which may be adjusted in a simple manner to respond to different levels of low pressure of the fluid being sensed.

Yet a further object is to provide such a low pressure pilot valve which may be conveniently manually overridden to a position for exhausting the actuator.

These and other objects are accomplished, in accordance with the illustrated embodiment of the invention, by a pilot valve of the type described comprising a body which has a chamber therein, a first port connecting with the chamber to admit control fluid to it, a first seat about the intersection of the first port with the chamber, a passageway connecting with the chamber, a vent port connecting the passageway with the exterior of the body, a second seat about the connection of the chamber and the passageway, and a second port for connecting the chamber with the actuator. More particularly, a ball is shiftable in the chamber between a first position seated on the first seat to prevent the admission of control fluid to the chamber while permitting control fluid to exhaust from the chamber out the vent port, and a second position seated on the second seat to prevent the exhaust of control fluid from the chamber out the vent port, while admitting control fluid through the first port to the chamber. A spring-pressed stem extends into the chamber in the body to yieldably urge the ball from its second to its first position, whereby the ball is so shifted when the fluid pressure within the chamber drops below a predetermined value. A pilot valve of the above-described construction not only accomplishes the purposes of the previously described pilot valve, for use in these or similar systems, but also is capable of doing so with a valve means comprising merely a ball, as compared with the complex valve means of the prior art.

Preferably, the area of the first seat is considerably smaller than that of the second seat, as a result of which line pressure is ordinarily insufficient to shift the ball from the first seat to the second seat, thereby requiring that it be reset manually. On the other hand, movement of the ball from the larger second seat causes an immediate release of the force opposing that of the spring urging the ball to the second seat, so that the ball moves to its tripped position on the first seat with a snap action. In accordance with the preferred embodiment of the present invention, the ball is reset by a part which is manually manipulatable from the exterior of the body for moving the stem in a direction away from the second seat to permit the ball to shift from its first to its second position. This part, when released, is automatically returned to its original position by the spring, whereby the stem is urged by the spring back to a position in which it yieldably urges the ball toward its first position, and the pilot valve is reset as long as the line pressure is above the predetermined low value. The stem also has a part on the exterior of the body which may be manually manipulated to move the ball from the second seat onto the first seat, so as to override the automatically operable means for tripping it, regardless of the line pressure.

The spring is compressed between a projection on the stem and a cap on the outer end of a tubular housing extension through which the stem extends. The manually operabe part for resetting the ball comprises a pin which is mounted on the body for rotation in one direction to engage the projection and thereby move the stem in one direction against the force of the spring, and which is then releasable to permit it to be automatically returned to its original position by the force of the spring acting on the rotatable pin through the projection. The lower pressure at which the pilot valve is adapted to respond may be adjusted by manipulation of the cap on the tubular housing extension through its threaded connection thereto.

In the drawings, wherein like reference characters are used throughout to designate like parts:

FIG. 1 is a side view, partly in section and partly in elevation, of a pipeline having a valve installed therein and a fluid-operated actuator installed on the valve for moving it between line opening and closing positions, together with a system which includes a pilot valve constructed in accordance with the present invention for use in controlling the admission and exhaustion of line fluid to and from the actuator in response to a predetermined low pressure of the line fluid;

FIG. 3 is a side view of the pilot valve, partly in section and partly in elevation, with the ball thereof in its upper, set position;

FIG. 4 is a partly sectional view of the lower end of the pilot valve, as seen along broken line 4—4 of FIG. 3;

FIG. 5 is a cross-sectional view of the lower end of the pilot valve, as seen along broken line 5—5 of FIG. 4;

Figure 6:
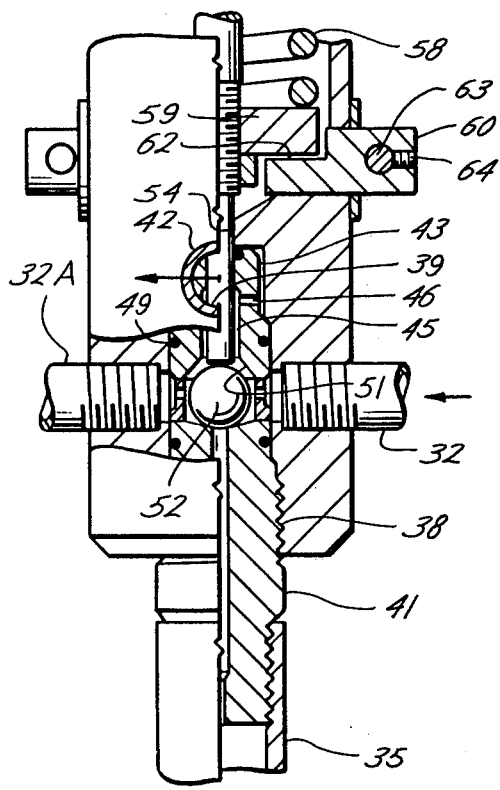
Figure 7:
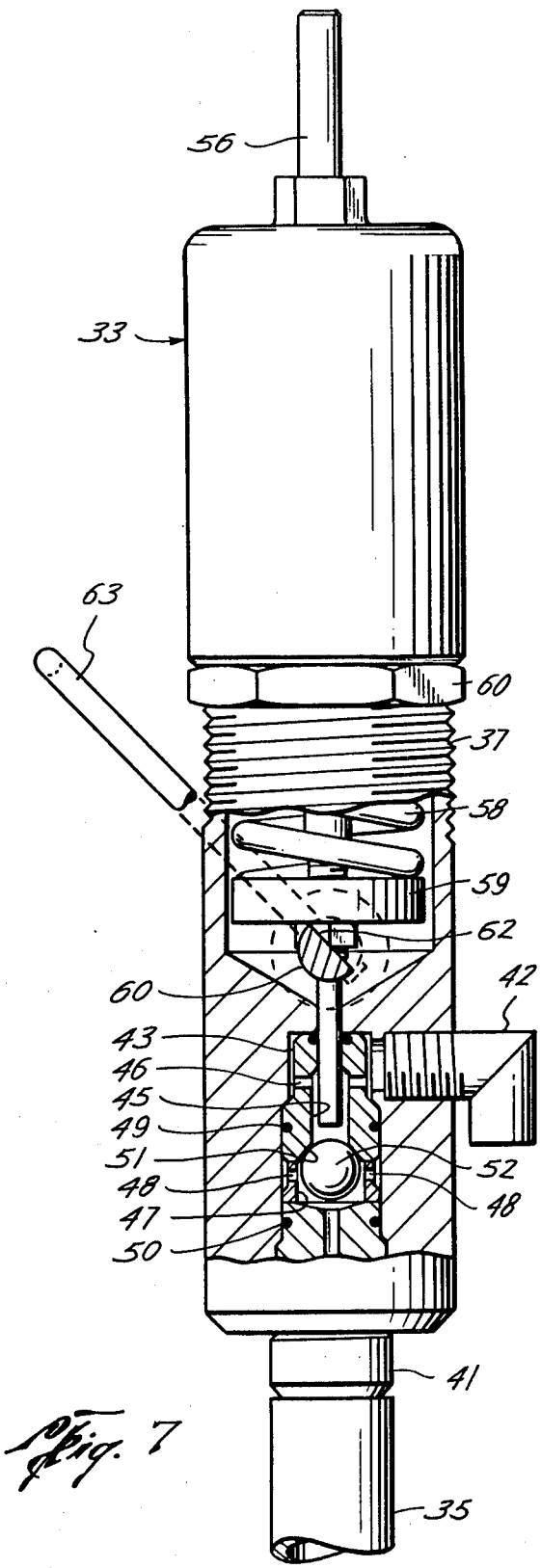

FIG. 6 is a partial sectional view of the lower end of the pilot valve, similar to that of FIG. 3, but with the ball thereof moved downwardly to its tripped position; and FIG. 7 is a partial side view of the side of the pilot valve, as seen in FIG. 5, but with the lower portion thereof broken away and with a handle thereon swung upwardly to rotate a pin in order to raise the stem and thereby permit the ball to be reset.

Figure 1:
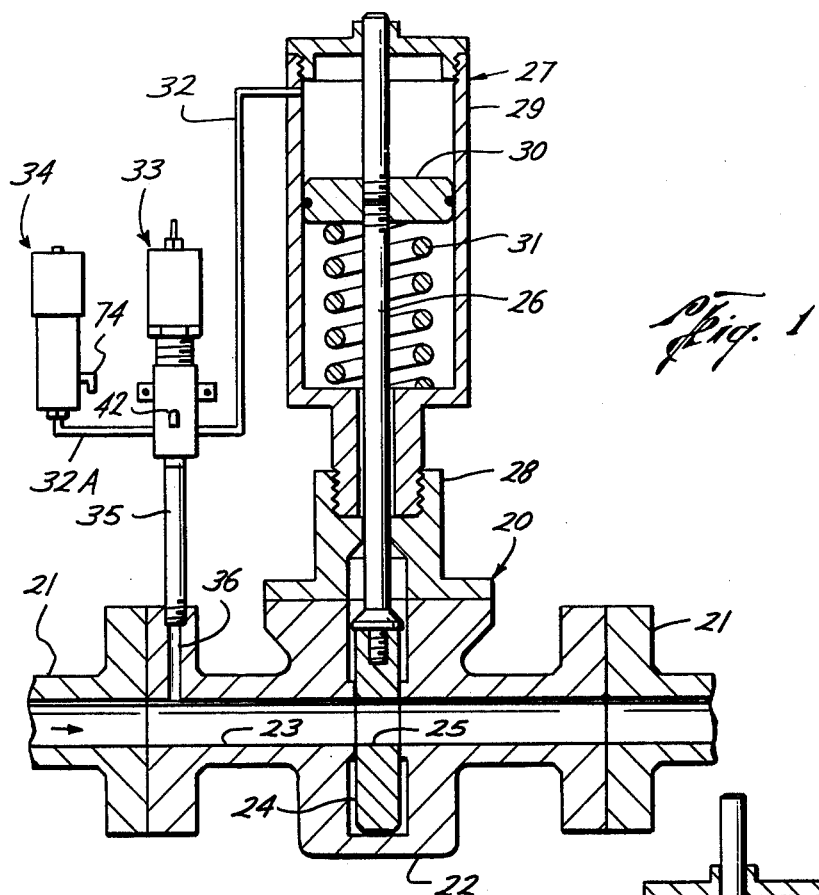
Figure 2:
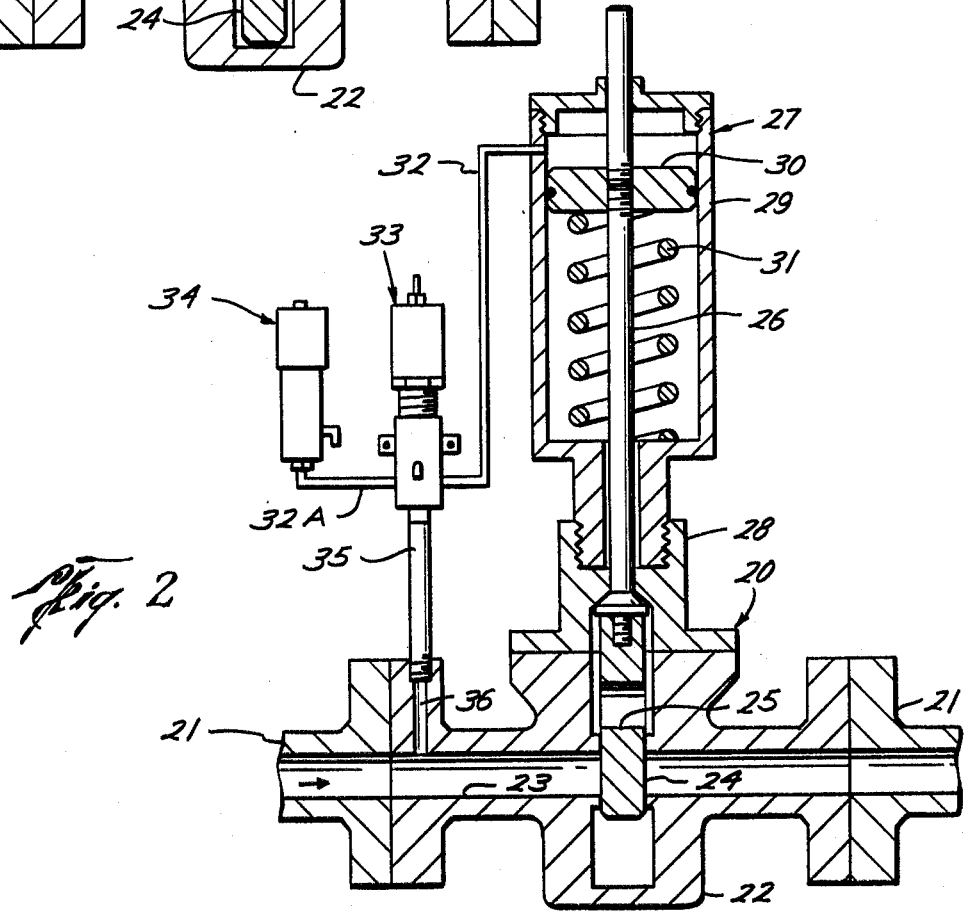
FIG. 2 is a view similar to FIG. 1, but with the line fluid exhausted from the upper end of the actuator and the line valve moved to line closing position upon tripping of the ball of the pilot valve in response to a predetermined low pressure of the line fluid.

With reference now to the details of the above-described drawings, valve 20 shown in FIGS. 1 and 2 includes a body 22 having a flowway 23 connected in alignment with a pipeline 21, and a closure element 24 reciprocable within the valve body between the open position of FIG. 1 and the closed position of FIG. 2. The gate is of the through-conduit type having a hole 25 which is aligned with the flowway 23 in the open position of the valve, and which is raised to a position above the flowway to dispose a solid portion of the gate across the flowway in the closed position of the valve.

The closure element 24 is moved between its opened and closed positions by means of a stem 26 which extends sealably through an opening in a bonnet 28 on the valve body to permit it to be reciprocated by means of an actuator 27 installed upon the bonnet 28. The actuator includes a body providing a cylinder housing 29 and having an opening in its lower end aligned with the bonnet opening to receive the stem 26 therethrough. A piston 30 connected to stem 26 is sealably slidable within the cylinder between an upper position to raise the valve to its closed position, as shown in FIG. 2, and a lower position to lower the valve to its open position, as shown in FIG. 1.

Piston 30 is urged to its upper position by means of a coil spring 31 disposed between it and the lower end of housing 29, and is urged to its lower position by means of line fluid which is admitted thereto through conduit 32 connecting with the upper end of housing 29. As will be described in detail to follow, when line fluid is admitted through conduit 32 to the upper end of piston 30, it forces the piston downwardly against the force of spring 31 so as to open the valve. However, upon exhaustion of line fluid through conduit 32 from the actuator above piston 30, the piston is permitted to move upwardly so as to lift the valve 24 to its closed position. This alternate admission and exhaustion of line fluid to and from the actuator is controlled by means of the system which includes a low pressure sensor 33, a high pressure sensor 34, a conduit 35 connecting flowway 23 with an inlet port to the low pressure sensor, and a conduit 32A connecting a port in the low pressure sensor with an inlet port to the high pressure sensor.

In the illustrated system, wherein the line valve is normally opened and caused to close in response to predetermined high and low pressures of line flow, flow of line fluid is from left to right. As will be understood from the description to follow, this facilitates resetting of the pilot valve by virtue of a buildup in line pressure upstream of the closed line valve.

The low pressure sensor 33 is best shown in FIGS. 3 to 7 to comprise a pilot valve having body 37 including a lower portion having an interior which connects with inlet port 38 at its lower end, a vent port 39 near its upper end, and ports 40 and 40A on opposite sides of a portion thereof intermediate the inlet port 38 and vent port 39. Conduit 35 connecting with the flowway 23 to threadedly connected to inlet port 38 by means of a nipple 41, and a downwardly turned vent pipe 42 is threadedly connected to the vent port 39. Conduit 32 connecting with the actuator is threadedly connected with side port 40, and conduit 32A connecting with the high pressure sensor 34 is threadedly connected with side port 40A.

The interior of the lower portion of the body is formed by a bore which extends upwardly from inlet 38, and tubular inserts 43 and 44 are received closely in the bore and held in place by the upper end of nipple 41. The upper insert 43 has a vertical passageway 45 therethrough and side ports 46 connecting the passageway with an annular space about the insert, and thus with the vent pipe 42. The lower insert 44 has an enlarged inner diameter which provides a chamber 47 connecting the hole through the upper end of nipple 41 with passageway 45, and side ports 48 which connect the chamber with an annular space thereabout, and thus with chamber 47 and each of the conduits 32 and 32A connecting with ports 40 and 40A, respectively. Seal ring 49 is carried about outer diameter of the upper end of nipple 41, each for sealing with the bored interior of the lower portion of the body to prevent the loss of fluid from the chamber. Additionally, the lower end of the body is counterbored to provide seats 49A and 50A against which shoulders on insert 43 and nipple 41 are engaged to provide metal-to-metal seals which back up the seals provided by seal rings 49 and 50.

The lower end of passageway 45 is conically shaped at its intersection with the chamber 47, and the upper end of nipple 41 is conically shaped at its intersection therewith, but to a much smaller angle with respect to the horizontal. A ball 52 is vertically shiftable within the chamber 47 between an upper position seated on a seat 51 about the upper conical surface so as to prevent the flow of line fluid within the chamber into the passageway 45 and thus out the vent tube 42, and a lower position in which to seat on a lower seat defined by the upper end of the opening through nipple 41 as to prevent the admission of line fluid into chamber 47. In both its upper and lower seated positions, as well as in all positions intermediate thereof, the sides of the ball are spaced from the sides of the passageway 47 so as to permit fluid to flow between the inlet and each of the conduits 32 and 32A when the ball is in its upper or set position, and between the passageway 45 and each of the conduits 32 and 32A when the ball is in its lower seated or tripped position.

The body also includes an upper tubular portion 52a which extends upwardly from the lower body portion in coaxial relation with the passageway 45, and a cap 53 threadedly connected to the upper end of portion 52a so as to close same. The upper end of passageway 45 is connected to the lower end of the tubular extension by an opening 54, and a hole 55 is formed in the upper end of the cap coaxially of opening 54. A rod 56 extends into the hole 55 within the cap 53, through the tubular extension 52, and into the opening 54 for engagement at its lower end with the upper end of ball 52. A seal ring 56a is carried within hole 55 for preventing dust and debris from entering the tubular extension, and a seal ring 57 is carried by the upper inner corner of upper insert about passageway 45 so as to seal about the rod 56 and between the insert and lower body portion in order to contain fluid within the passageway.

The rod 56 is urged in a downward direction and thus toward the ball by means of a coil spring 58 within tubular extension 52a which bears at its upper end on cap 53 and at its lower end upon a flange 59 threaded about an intermediate portion of the rod 56. This of course provides a force which yieldably urges the rod downwardly and thus the ball 52 from its upper seated position toward its lower seated position. The amount of this force is adjustable by means of the threaded connection of the cap to the tubular extension 52a -e.g., a lock nut 60 may be backed off of the low end of the cap 53 to permit it to be moved downwardly thus increasing the compression of spring 58.

When in its upper seated or set position, the ball is acted upon by an upwardly directed force equal to the pressure of line fluid within chamber 47 times the area of the seat 51 formed on the conical surface at the lower end of insert 43. This upwardly directed force is in turn opposed by the force due to the spring 58, so that as long as the line pressure is above a predetermined minimum value, the ball will remain in its set or upper position. In this set position of the ball, line fluid is admitted through the inlet to each of the conduits 32 and 32A. Line fluid flowing through conduit 32 is of course admitted to the upper end of piston 30 to hold the actuator in its downward position and thus maintain the line valve open.

However, in the event pressure within the chamber 47 drops below this predetermined minimum, as might occur in event of a break in the line 21, the ball will be forced from its upper seat. Due to the relatively large area over which the ball seats in its upper position, it will, as soon as it is unseated, be moved rapidly downwardly to its lower seated position with a snap action due to the force of spring 58. At this time, fluid within the actuator above piston 30 is exhausted through line 32, chamber 47 and passageway 45 and out through vent tube 42, so as to permit the actuator piston to move upwardly to close the gate. Of course, fluid is also vented from conduit 32A leading to the high pressure sensor 34, although, as will be described, the effect of that is unimportant since sensor 34 is closed.

When ball 52 is in its lower tripped position, it is seated upon a relatively small area defined by the diameter of the hole through nipple 41 intersecting with chamber 47. Thus, under normal operating conditions, the pressure of the fluid within the line 21 is not sufficient to overcome the force of the spring 58, even though line fluid has been exhausted from chamber 47 through vent pipe 42. Thus, in a manner to be described to follow, it is necessary to manually reset the pilot valve 33 when it is to be put back in use.

Furthermore, even if the pressure of line fluid should be large enough to unseat the tripped ball 52, this would only be momentary, since upon being unseated, the ball would permit additional line fluid to be exhausted, thus reducing the force tending to lift it and permitting the spring to move it back to tripped position. As a matter of fact, this need for resetting the ball manually is desirable from the standpoint of the user of this equipment, since for example it permits him to inspect the line to find a reason for the drop in line pressure which caused the ball to trip, before this system is put back into service.

The ball is so reset by means of pins 60 rotatably mounted within holes 61 formed in opposite sides of the pilot valve body 37 at approximately the joinder of the lower portion of the body and the tubular extension thereof. More particularly, each such pin has a flat cam surface 62 formed on its inner end which is disposed beneath the lower side of spring retainer flange 59 in the elevated position which stem 56 occupies when the ball is lifted to its set position, as best shown in FIG. 4. When the ball is to be reset, pins 60 are rotated to the position shown in FIG. 7, to raise the cam surface 62 against flange 59 to lift the lower end of the stem above the position it occupies in the reset position of the valve, as shown in FIG. 3.

With the pins held in this position, line pressure in sufficient to lift the ball from its tripped position to its set position since the only force which would oppose the lifting force to the line pressure, even assuming the valve is in the vertical position shown in the drawings, is the weight of the ball. Furthermore, once the ball is lifted, the flow of line fluid about the ball within the chamber 47 and into passageway 45 for exhausting through vent pipe 42 will actually draw the ball upwardly to the unseated position of FIG. 7. Upon return of the pins 60 to the positions of FIGS. 3 and 4, the spring may expand to permit the lower end of the stem to be moved back into engagement with the reset ball. As long as line pressure now acting over the area of seat 51 is above the predetermined low, it provides a force which is greater than that of the spring so that the ball remains reset until line pressure drops below the predetermined low.

As shown, the pins are swung between these alternate positions by means of a "U"-shaped handle 63 having its ends secured in holes through the outer ends of pins 60 by means of set screws 64. In the inactive position of the pins 60, the handle 63 is in a position generally transverse to the length of the valve body, and thus horizontal in the event the valve body extends vertically. As shown in FIG. 7, only about 45° of rotation of the pins is required to lift the stem the required distance, so that the loop avoids interference with the pilot valve body in this position as well.

Since less than 90° of rotation of the pins is required, they are constantly urged from the position of FIG. 7 back to the position of FIG. 3 by the force of the spring 58. Consequently, the user of equipment need only release the handle 63 upon permitting the ball to reset, regardless of the disposition of the sensor body with respect to the horizontal. Furthermore, since the cam surfaces 62 will remain relatively close to the lower side of the flange 59 in the inactive position of FIG. 3 the pins are prevented from rotating to any significant extent out of their inactive positions, again regardless of the disposition of the sensor body with respect to the horizontal.

In using this equipment, the operator will hold the handle in the position of FIG. 7 until sufficient line fluid has entered chamber 47 and passed through conduit 32 in order to lower the piston 30 and thus move the line valve to opened position. This, of course, can be observed by the downward movement of the upper end of the stem 26 which projects from the upper end of cylinder housing 29.

The ball will remain in its reset position until there has been a drop in the pressure of the line fluid below the predetermined minimum, or unless there are other reasons for such a drop in pressure in chamber 35, leak in the actuator above the piston 30 or other malfunction of the equipment. Alternatively, the ball may be tripped due to loss of pressure in chamber 47 resulting from a remote control device (not shown) connected to the chamber through another port (not shown) in the valve body. Still further, the automatic tripping mechanism may be overriden and the ball 52 moved to its tripped position manually by depression of the upper end of the stem 56 which extends through the hole 55 in the upper end of cap 53.

As previously described, conduit 32A connects chamber 45 of the pilot valve to the inlet to the interior of the high pressure sensor 34. Thus, upon opening of the inlet, in response to a predetermined high pressure in the chamber, line fluid will pass through the interior of the sensor and out a vent port 74 therefrom to exhaust the actuator above piston 30. The construction and operation of sensor 34, and its cooperation with the low pressure sensor and its function in a system including both sensors, are fully described in my copending applications filed this date, and entitled "Flow Line Control System" and "Pressure Relief Valve", both being assigned to the assignee of the present application.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is comtemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pilot valve for use in controlling the flow of a control fluid to and from a fluid-operated actuator, comprising a body having a chamber therein, a first port connecting with the chamber to admit control fluid thereto, a first seat about the intersection of the first port with the chamber, a passageway connecting with the chamber, a vent port connecting the passageway with the exterior of the body, a second seat about the connection of the chamber and passageway, a second port for connecting the chamber with the actuator, a ball shiftable in the chamber between a first position seated on the first seat to prevent the admission of control fluid to the chamber while permitting control fluid to exhaust from the chamber out the vent port, and a second position seated on the second seat to prevent the exhaust of control fluid from the chamber out the vent port while admitting control fluid through the first port to the chamber, a spring-pressed stem extending into the chamber to yieldably urge the ball from its second to its first position, whereby said ball is so shifted when the fluid pressure within said chamber drops below a predetermined value, and means for returning the ball to its second position including a part manipulatable from the exterior of the body for moving the stem in a direction away from the second seat to permit the ball to shift from its first to its second position.

2. A pilot valve of the character defined in claim 1, wherein the area of the first seat is considerably smaller than that of the second seat.

3. A pilot valve of the character defined in claim 1, wherein the stem has a part on the exterior of the body which may be manipulated to move the ball from said second seat onto said first seat.

4. A pilot valve of the character defined in claim 1, wherein said part, when released, is automatically returned to its original position by said spring, whereby the stem is urged by said spring back to a position in which it yieldably urges the ball toward its first position.

5. A pilot valve of the character defined in claim 4, wherein the stem has a part on the exterior of the body which may be manipulated to move the ball from said second seat onto said first seat.

6. A pilot valve for use in controlling the flow of a control fluid to and from a fluid-operated actuator, comprising a body having an inlet for admitting line fluid to the interior thereof, a vent opening connecting with the interior thereof for exhausting line fluid therefrom, and an outlet for connecting the interior with the actuator, valve means shiftable between a first position opening the inlet while closing the connection of the interior to the vent opening, and a second position closing the inlet while opening the connection of the interior to the vent opening, a spring-pressed stem urging the shiftable valve means from its first position so that said valve means will be shifted from its first to its second position when line pressure within the interior drops below a predetermined value, and means for returning the valve means to its second position including a part manually manipulatable from the exterior of the body for moving the stem in a direction away from the second seat to permit the ball to shift from its first to its second position, said part, when released, being automatically returned to its original position by said spring, whereby the stem is urged by said spring back to a position in which it yieldably urges the valve means toward its first position.

7. A pilot valve of the character defined in claim 6, wherein the stem has a part on the exterior of the body which may be manually manipulated to shift the valve means from said first position into said second position.

8. A pilot valve of the character defined in claim 7, wherein the stem has an outward projection thereon, and the manually manipulatable part comprises a pin rotatably mounted on the body and having means thereon engageable with the projection to move the stem in response to rotation of the pin in one direction, the force of the spring causing the pin to rotate in the opposite direction when said pin is released.

9. A pilot valve of the character defined in claim 8, wherein the spring surrounds the stem and is held at opposite ends between the body and the projection on the stem.

10. A pilot valve for use in controlling the flow of a control fluid to and from a fluid-operated actuator, comprising a body having a chamber therein, a first port connecting with the chamber to admit control fluid thereto, a first seat about the intersection of the first port with the chamber, a passageway connecting with chamber, a vent port connecting the passageway with the exterior of the body, a second seat about the connection of the chamber and passageway and arranged coaxially of and facing oppositely to the first seat, a second port for connecting the chamber with the actuator, a ball shiftable in the chamber between a first position seated on the first seat to prevent the admission of control fluid to the chamber while permitting control fluid to exhaust from the chamber out the vent port, and a second position seated on the second seat to prevent the exhaust of control fluid from the chamber out the vent port while admitting said control fluid through the first port to the chamber, said body having a tubular extension arranged coaxially of the chamber and connected to the passageway by an opening coaxial of the seats, and a cap on the outer end of the housing extension, said cap having an opening aligned with the body opening, a stem extending sealably through the body opening and out through the cap opening, a projection on the stem, and a spring compressed between the cap and the projection to force the stem into engagement with the ball and thus yieldably urge it from its second to its first position, whereby said ball is so shifted when the fluid pressure within said chamber drops below a predetermined value.

11. A pilot valve of the character defined in claim 10, including means for returning the ball to its second position including a part manipulatable from the exterior of the body for moving the stem in a direction away from the second seat to permit the ball to shift from its first to its second position.

12. A pilot valve of the character defined in claim 11, including a pin rotatably mounted on the body and having means thereon engageable with the projection on the stem to move the stem in a direction away from the ball, in response to rotation of the pin in one direction, to permit the ball to shift from its secon position, the force of the spring causing the stem to rotate in its opposite direction when said pin is released.

13. A pilot valve for use in controlling the flow of a control fluid to and from a fluid-operated actuator, comprising a body having a chamber therein, a first port connecting with the chamber to admit control fluid thereto, a first seat about the intersection of the first port with the chamber, a passageway connecting with the chamber, a vent port connecting the passageway with the exterior of the body, a second seat about the connection of the chamber and passageway, a second port for connecting the chamber with the actuator, a ball shiftable in the chamber between a first position seated on the first seat to prevent the admission of control fluid to the chamber while permitting control fluid to exhaust from the chamber out the vent port, and a second position seated on the second seat to prevent the exhaust of control fluid from the chamber out the vent port while admitting control fluid through the first port to the chamber, said body having an opening therein connecting with the passageway, a stem extending sealably through the opening and into the passageway, and a spring compressed between shoulders on the stem and body exteriorly of the passageway to yieldably urge the ball from its second to its first position, whereby said ball is so shifted when the fluid pressure within said chamber drops below a predetermined value.

14. A pilot valve of the character defined in claim 13, wherein the area of the first seat is considerably smaller than that of the second seat.

15. A pilot valve of the character defined in claim 14, including means for returning the ball to its second position including a part manually manipulatable from the exterior of the body for moving the stem in a direction away from the second seat to permit the ball to shift from its first to its second position.

16. A pilot valve of the character defined in claim 15, wherein the stem has a part on the exterior of the body which may be manipulated to move the ball from said second seat onto said first seat.

17. A pilot valve of the character defined in claim 13, wherein said part, when released, is automatically returned to its original position by said spring, whereby thge stem is urged by said spring back to a position in which it yieldably urges the ball toward its first position.

18. A pilot valve of the character defined in claim 13, wherein the stem has a part on the exterior of the body which may be manipulated to move the ball from said second seat onto said first seat.

* * * * *